US008422378B2

(12) United States Patent
Aoki (10) Patent No.: US 8,422,378 B2
(45) Date of Patent: Apr. 16, 2013

(54) MOBILE COMMUNICATION TERMINAL TEST APPARATUS AND TEST RESULT DISPLAY METHOD (75) Inventor: Kazunori Aoki, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 379 days.

(21) Appl. No.: 12/967,310

(22) Filed: Dec. 14, 2010

(65) Prior Publication Data

US 2011/0141934 A1 Jun. 16, 2011

(30) Foreign Application Priority Data

Dec. 16, 2009 (JP) ................................ 2009-285337

(51) Int. Cl.
H04L 12/26 (2006.01)
(52) U.S. Cl.
USPC .......................................... 370/241; 370/252
(58) Field of Classification Search .................. None
See application file for complete search history.

(56) References Cited

U.S. PATENT DOCUMENTS

| | | | |
|---|---|---|---|
| 2008/0120035 A1* | 5/2008 | Hassan et al. | 702/10 |
| 2008/0151760 A1 | 6/2008 | Michl | |
| 2008/0151772 A1 | 6/2008 | Akita et al. | |
| 2009/0046625 A1* | 2/2009 | Diener et al. | 370/319 |
| 2010/0110973 A1* | 5/2010 | Hart | 370/315 |
| 2010/0266002 A1* | 10/2010 | Du et al. | 375/224 |
| 2011/0116561 A1* | 5/2011 | Yoo et al. | 375/260 |

FOREIGN PATENT DOCUMENTS

JP 2003046431 A 2/2003

* cited by examiner

Primary Examiner — Steven H Nguyen
(74) Attorney, Agent, or Firm — Pearne & Gordon LLP (57) ABSTRACT

[Task] To provide a mobile communication terminal test apparatus capable of displaying an EVM or a transmission power measurement result in a frequency division multiple access communication scheme by distinguishing between the allocation band and the non-allocation band.

[Means for Resolution] A test signal including control information representing the communication channel and the allocation band is transmitted to the mobile communication terminal, the test signal output from the mobile communication terminal is received, the output waveform data are analyzed, a measurement value of a predetermined measurement item is obtained on a symbol-by-symbol basis, the obtained symbol-based measurement value is displayed on a graph, and the allocation band on the corresponding graph and the non-allocation band within the communicate channel are displayed to be distinguished therebetween.

7 Claims, 5 Drawing Sheets

MOBILE COMMUNICATION TERMINAL TEST APPARATUS AND TEST RESULT DISPLAY METHOD

TECHNICAL FIELD

The present invention relates to a test apparatus and test result display method, by which a signal from a mobile communication terminal is measured, and a measurement result in an allocation band allocated to the mobile communication terminal within a channel of the corresponding signal and a measurement result in bands other than the allocation band within the corresponding channel are displayed in a distinguishable manner.

BACKGROUND ART

In the related art, a mobile communication terminal test apparatus that tests transmit/receive characteristics of a mobile communication terminal is known. The mobile communication terminal test apparatus includes a transmit unit that transmits a signal to the mobile communication terminal and a receive unit that receives a signal from the mobile communication terminal and performs a test for the corresponding mobile communication terminal by operating as a pseudo base station and transmitting/receiving a signal to/from the mobile communication terminal.

As a test item of the mobile communication terminal, an error vector magnitude (EVM) measurement that measures a positional difference between a measurement modulation signal and an ideal modulation signal within the signal band (hereinafter, referred to as a "band channel") from the mobile communication terminal is known.

For example, Patent Document 1 discloses a mobile communication terminal test apparatus that measures a signal level from the mobile communication terminal.

On the other hand, according to Long Term Evolution (LTE) which is a next generation mobile communication standard, a plurality of channel widths (1.4 MHz, 3 MHz, 5 MHz, 10 MHz, 15 MHz, or 20 MHz) is defined as a 3GPP standard.

According to the LTE, a frequency division multiple access (FDMA) scheme is employed as a communication scheme. As a result, communication among a plurality of mobile communication terminals is multiplexed through a single channel (hereinafter, referred to as a "transmission channel, wherein the bandwidth of the transmission channel will be referred to as a "transmission channel width") used in the communication in practice within the band channel. Therefore, a single mobile communication terminal rarely uses the entire frequency band of a single transmission channel, and communication is made by allocating a part of the frequency band of a single transmission channel to a single mobile communication terminal. Such a band allocation is performed on a resource block (RB)-by-RB basis.

Specifically, in the LTE system, a bundle of data having a frequency range of a unitary frequency band width $\Delta F$ (e.g., $\Delta F=12$ subcarriers) and a unitary time width (e.g., $\Delta T=0, 5$ ms=1 slot=7 symbols) is set to a resource block (RB), and a block of a unitary time width $\Delta T$ and a frequency bandwidth $n\Delta F$ (where n denotes any integer equal to or larger than 1) formed on an RB-by-RB basis (hereinafter, referred to as a "current block," wherein in the case of n=1, a current block is equal to the RB) is transmitted by changing a digital communication signal in a hopping manner on a frequency-time domain as time elapses. In other words, a frequency F having a frequency band of F to $F+n\Delta F$ (a frequency range of the current block) and a value of n representing the magnitude of the bandwidth are changed for every unitary time width $\Delta T$. However, it is possible that the frequency F changes for every twice the unitary time width $\Delta T$ (2 slots).

In addition to the frequency for every unitary time width $\Delta T$, transmission is made by defining transmission conditions such as a modulation scheme, a transmission rate, transmission power (they are together known as "transmission information"). Such changes in the transmission information are performed by controlling a station to obtain a transmission quality depending on a propagation status.

Figure 7:
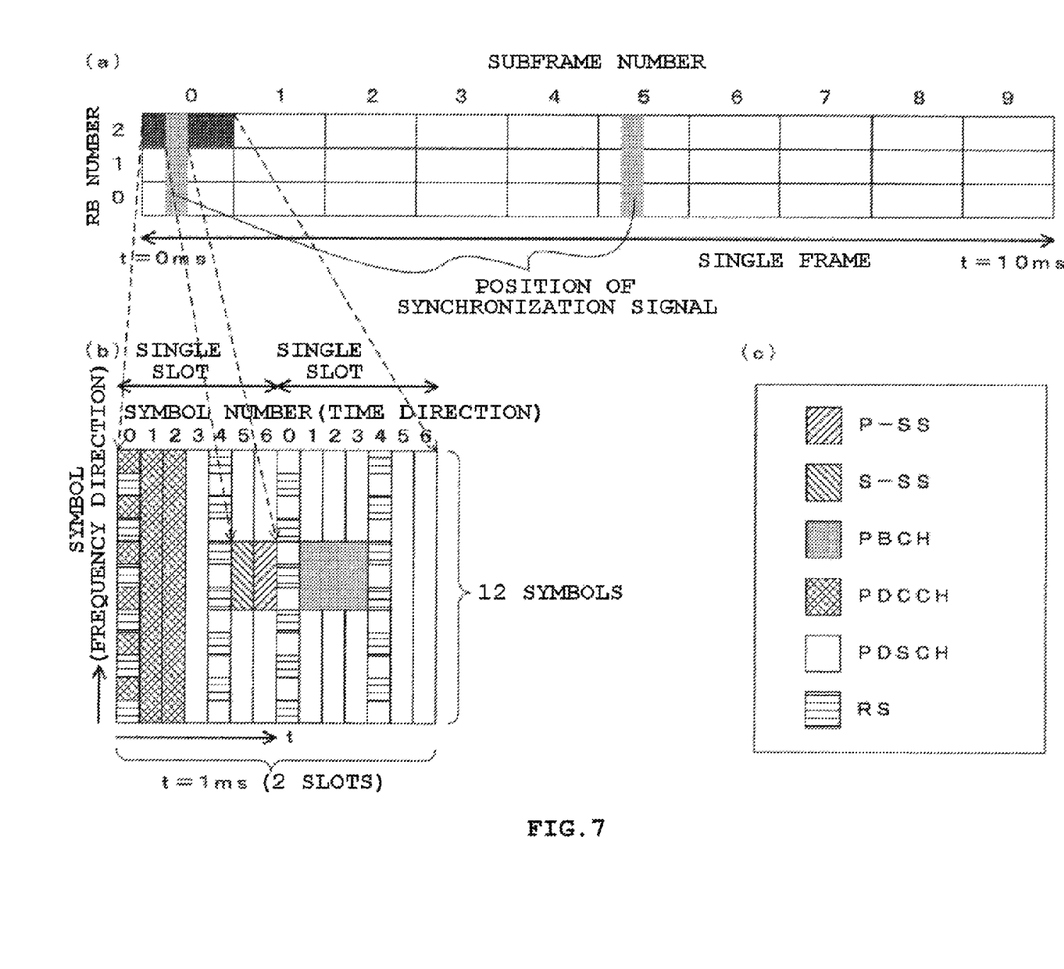
FIG. 7 is a diagram for describing a data format in digital communication.

In addition, a part of the aforementioned transmission information is embedded in a data format that defines a digital communication signal. Hereinafter, the data format will be described. A digital signal is transmitted using a data format shown in FIG. 7. In FIG. 7, a single frame includes 10 subframes for 10 ms (milliseconds). Among them, P-SS (first synchronization signal) or S-SS (second synchronization signal) are included in the 0th and 5th subframes. Each subframe includes a plurality of RBs. As shown in FIG. 7(b), each RB constitutes a single slot along the time axis, and a single slot includes 7 items of symbol data along the time axis. A single RB includes 12 subcarriers along the vertical axis as shown in FIG. 7(b). The subcarriers are set at an interval of 15 kHz. In addition, for the RB, data embedded in each symbol are determined as shown in FIGS. 7(b) and 7(c). In FIGS. 7(b) and 7(c), the primary synchronization signal (P-SS) and the secondary synchronization signal (S-SS) are the first and second synchronization signals, respectively, used to transmit or receive digital signals in synchronization. In addition, a physical broadcast channel (PBCH), a physical downlink control channel (PDCCH), a physical downlink shared channel (PDSCH), and a reference signal (RS) are provided. Among them, the PDCCH includes control information for controlling the RB and a modulation scheme of PDSCH (e.g., QPSK modulation, 16-QAM, 64-QAM, and the like). In the PDSCH, user data are included and modulated based on the modulation scheme controlled by the PDCCH. In addition, the modulation scheme is changed to obtain a transmission quality under the propagation conditions and the like at that time. The RS is also referred to as a reference signal and used as a reference signal when the receiver apparatus in the wireless terminal (mobile station) side performs demodulation or used in equalization of the propagation path.

In the uplink, as a modulation scheme, the SC-FDMA is used. According to the SC-FDMA, communication is performed by converting each subcarrier of the frequency domain into symbols of the time domain. Then, the symbols included in a single slot along the time domain (7 symbols included in a single slot) are referred to as "time-oriented symbols," and the symbols obtained by converting each subcarrier from the frequency-domain to the time domain are referred to as "frequency-oriented symbols." In addition, in the case of simply referring to a "symbol", it is assumed that a single symbol is designated by a frequency-oriented symbol position and a time-oriented symbol position.

[Related Art Document]

[Patent Document]

[Patent Document 1] Japanese Unexamined Patent Application Publication No. 2003-46431

DISCLOSURE OF THE INVENTION

Problem that the Invention is to Solve

In the related art (e.g., Patent Document 1), the mobile communication terminal test apparatus displays the aforementioned EVM measurement result on a 2-dimensional graph in which one axis denotes a frequency and the other axis denotes a measurement value (signal level or EVM). In this case, the corresponding mobile communication terminal test apparatus displays the entire transmission channel width of the mobile communication terminal as the frequency axis.

According to the frequency division multiple access communication scheme such as the LTE, in order to display the EVM measurement results including the measurement result in the RM (hereinafter, referred to as an "allocation band") corresponding to the band allocated to the mobile communication terminal and the measurement result in the RB (hereinafter, referred to as a "non-allocation band") corresponding to the band other than the allocation band within the transmission channel, both measurement results are mixedly displayed in the related art.

In this case, since the measurement result of the allocation band and measurement result of the non-allocation band are not displayed in a distinguishable manner, a tester is required to read the portion corresponding to the measurement value of the allocation band from the displayed graph several times. It is time-consuming to analyze the measurement results and determine whether the measurement result is right or wrong.

To address the aforementioned problems, it is envisaged that the measurement result of the allocation band and the measurement result of the non-allocation band are displayed in a distinguishable manner. However, the control information representing the allocation band is not included in the signal transmitted from the mobile communication terminal. Therefore, it is difficult for the mobile communication terminal test apparatus to divide the signal from the mobile communication terminal into the portion corresponding to the allocation band and the portion corresponding to the non-allocation band and identify each one based on the information included in the corresponding signal.

The present invention has been made to address the aforementioned problems, and it is desirable to provide a mobile communication terminal test apparatus and a test result display method, relating to the EVM measurement according to the frequency division multiple access communication scheme, by which the measurement result of the allocation band and the measurement result of the non-allocation band are displayed in a distinguishable manner.

Means to Solve the Problems

In order to address the aforementioned problems, according to claim 1 of the invention, there is provided a mobile communication terminal test apparatus including: a signal transmit unit that transmits a signal including control information for controlling a mobile communication terminal to the mobile communication terminal; a signal receive unit that receives a test signal output from the mobile communication terminal based on the control information and outputs waveform data; a signal analysis unit that measures a measurement value relating to a predetermined measurement item on a symbol-by-symbol basis based on the waveform data; and a display unit that displays the measurement value measured by the signal analysis unit, wherein the mobile communication terminal transmits or receives the signal according to a frequency division multiple access communication scheme, and the control information includes information on a communication channel and an allocation band allocated to the mobile communication terminal within the communication channel, and wherein the mobile communication terminal test apparatus further includes: a control unit that notifies the signal transmit unit, the signal receive unit, and the signal analysis unit of a test condition including the communication channel, a bandwidth of the communication channel, and a bandwidth of the allocation band; and a display control unit that receives the measurement value and the test condition from the signal analysis unit, displays, on the display unit, coordinates by setting the abscissa as a frequency-oriented symbol corresponding to the bandwidth of the communication channel and the ordinate as a measurement value, displays the measurement value on the coordinates as a graph, and displays the allocation band on the corresponding graph and bands other than the allocation band within the communication channel in a distinguishable manner.

According to claim 2 of the invention, in the mobile communication terminal test apparatus of claim 1, the predetermined measurement item includes either an error vector magnitude (EVM) representing a positional difference between a measurement modulation signal and an ideal modulation signal within a band of the communication channel or a transmission power of the mobile communication terminal.

According to claim 3 of the invention, there is provided a test result display method including: a transmission step in which a signal including control information is transmitted to a mobile communication terminal; a waveform data output step in which a test signal output from the mobile communication terminal based on the control information is received and output as waveform data; a measurement step in which a measurement value relating to a predetermined measurement item is measured on a symbol-by-symbol basis based on the waveform data; a coordinates display step in which coordinates are displayed by setting an abscissa as a frequency-oriented symbol and an ordinate as the measurement value; and a measurement value display step in which a first graph representing the measurement value is displayed on the coordinates, wherein, in the transmission step, the control information based on the measurement condition including a communication channel, a bandwidth of the communication channel, and an allocation band allocated to the mobile communication terminal within the communication channel is transmitted according to a frequency division multiple access communication scheme, in the measurement step, at least the measurement value within a range of the allocation band is measured, in the coordinates display step, the coordinates are displayed by setting the abscissa as a frequency-oriented symbol corresponding to the bandwidth of the communication channel, and in the measurement value display step, the first graph is displayed by setting the abscissa as the allocation band and the ordinate as the measurement value based on the communication channel, the bandwidth of the communication channel, and the allocation band.

According to claim 4 of the invention, in the test result display method of claim 3, the test result display method according to claim 3, wherein, in the measurement step, the measurement value of the signal for the non-allocation band other than the allocation band within the communication channel is further measured on a symbol-by-symbol basis, and in the measurement value display step, a second graph is further displayed on the coordinates so as to be distinguished from the first graph by setting the abscissa as a symbol within the non-allocation band and the ordinate as a measurement value of a signal within the non-allocation band.

According to claim 5 of the invention, in the test result display method of claim 4, in the measurement value display step, at least any one of the first and second graphs is colored.

According to claim 6 of the invention, in the test result display method of claim 4, in the measurement value display step, at least any one of an area for displaying the first graph and an area for displaying the second graph is colored.

According to claim 7 of the invention, in the test result display method of claim 3, the predetermined measurement item includes either an error vector magnitude (EVM) representing a positional difference between a measurement modulation signal and an ideal modulation signal within a band of the communication channel or a transmission power of the mobile communication terminal.

Advantage of the Invention

According to the present invention, in a coordinates system obtained by setting the abscissa as a symbol in a mobile communication and the ordinate as the EVM, the EVM measurement value of the signal from the mobile communication terminal is displayed based on the measurement condition including at least the allocation band received from the control unit so that it is possible to distinguish between the measurement value of the allocation band and the measurement value of the non-allocation band.

As a result, a tester can readily distinguish the portion corresponding to the measurement value of the allocation band from the displayed graph and readily determine whether the measurement result is right or wrong.

BEST MODE FOR CARRYING OUT THE INVENTION

Figure 1:
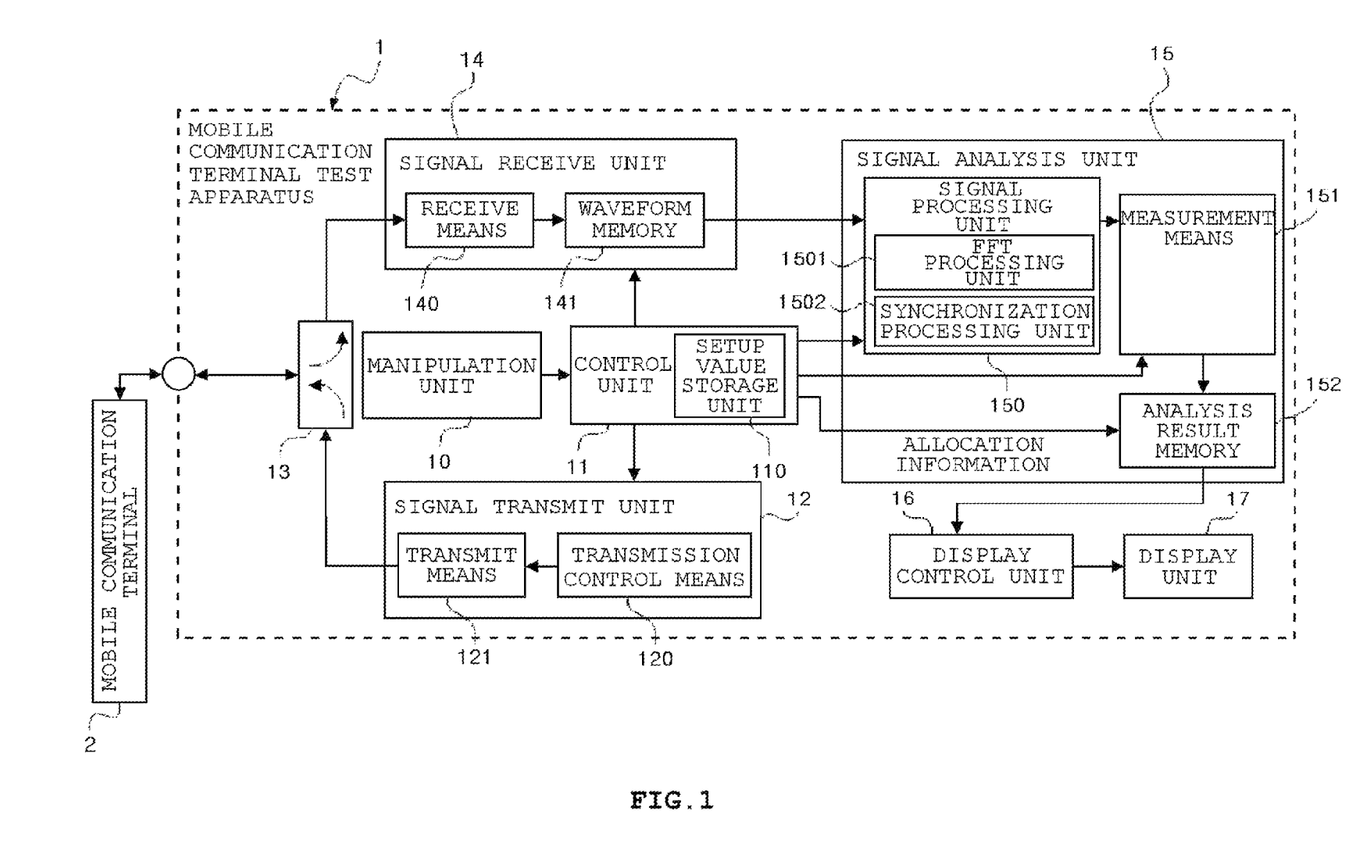
FIG. 1 is a functional block diagram illustrating a mobile communication terminal test apparatus.

First, a configuration of the mobile communication terminal test apparatus according to the present invention will be described with reference to FIG. 1.

(Configuration)

The mobile communication terminal test apparatus 1 according to the present invention is a mobile communication terminal test apparatus that measures the EVM of the signal from the mobile communication terminal 2 corresponding to the LTE communication scheme. The mobile communication terminal test apparatus 1 includes a manipulation unit 10, a control unit 11, signal transmit unit 12 that transmits control information used by the mobile communication terminal 2 to transmit a test signal to the mobile communication terminal 2, a directional coupler 13, a signal receive unit 14 that receives a signal returned from the mobile communication terminal 2, a signal analysis unit 15 that analyzes the waveform data of the signal received by the signal receive unit 14, a display unit 17, and a display control unit 16 that visualizes the result of the corresponding analysis and displays it on the display unit 17. Each unit will be described in detail hereinafter.

The manipulation unit 10 is an interface for instructing a tester to set the measurement conditions or execute the test. A tester sets a transmission channel width (1.4 MHz, 3 MHz, 5 MHz, 10 MHz, 15 MHz, or, 20 MHz) of the signal transmitted from the mobile communication terminal 2 or a band allocated to the mobile communication terminal 2 within the transmission channel as a measurement condition for the EVM of the signal from the mobile communication terminal 2 from the manipulation unit 10.

The control unit 11 specifies the allocation band RB from the band allocated to the mobile communication terminal 2 designated by the manipulation unit 10. In addition, the number of RBs that can be simultaneously used within the transmission channel is different depending on the transmission channel width. For example, when the transmission channel width is 20 MHz, the number of RBs that can be simultaneously used becomes 100. Similarly, when the transmission channel width is 10 MHz, the number of RBs that can be simultaneously used becomes 50. These are specified in the 3 GPP standard.

In addition, the control unit 11 creates control information used by mobile communication terminal 2 for transmitting a test signal through the designated allocation band and the transmission channel width based on the transmission channel width designated by the manipulation unit 10 and the specified allocation band. The control information is called downlink control information (DCI) and includes transmission information such as the transmission channel width, the current block (i.e., allocation band) allocated to the mobile communication terminal, the modulation scheme, and the information representing a transmission rate.

The control unit 11 stores, in the setup value storage unit 110, the DCI including information on the allocation band and the transmission channel width as a measurement condition. The control unit 11 transmits corresponding measurement conditions to the signal transmit unit 12, the signal receive unit 14, and the signal analysis unit 15 and controls operations of each unit. The signal transmit unit 12, the signal receive unit 14, and the signal analysis unit 15 will be described below.

The signal transmit unit 12 includes a transmit means 121 that transmits control information used by the mobile communication terminal 2 to transmit the test signal to the mobile communication terminal 2, and a transmit control means 120 that controls the operation of the transmit means 121.

The transmit control means 120 instructs the transmit means 121 to receive the instruction from the control unit 11 and the DCI from the manipulation unit 10 and transmit the corresponding DCI to the mobile communication terminal 2.

The transmit means 121 receives the instruction from the transmit control means 120, includes the DCI in the transmission signal (carrier wave), and transmits the transmission signal to the mobile communication terminal 2 through the directional coupler 13 which will be described below. The mobile communication terminal 2 transmits the test signal to the mobile communication terminal test apparatus 1 through the allocation band and the transmission channel designated by the corresponding DCI based on the corresponding DCI included in the transmission signal received from the transmit means 121.

The directional coupler 13 transmits the test signal from the transmit means 121 to the mobile communication terminal 2. In addition, the directional coupler 13 transmits the test signal transmitted from the mobile communication terminal 2 to the receive means 140.

The signal receive unit 14 includes a receive means 140 that receives the test signal returned from the mobile communication terminal 2 and converts the test signal into the digital signal data (hereafter, referred to as "waveform data") and a waveform memory 141 that stores the waveform data.

The receive means 140 receives the transmission channel width and the allocation band as a measurement condition from the control unit 11 and controls the receive frequency. As a result, the receive frequency of the receive means 140 is controlled to be the same as the carrier frequency of the test signal output from the mobile communication terminal 2.

The receive means 140 includes a frequency conversion means, an A/D conversion means, an orthogonal demodulation means, and a signal waveform storage means. The receive means 140 receives an orthogonal frequency division multiplexed digital communication signal modulated using a modulation signal having a frame of a data format of FIG. 7 from the mobile communication terminal 2 and converts the frequency of the digital communication signal into the intermediate frequency signal using the frequency conversion means. The A/D conversion means converts the intermediate frequency signal into the digital data. The orthogonal demodulation means separates the digital data into data of I and Q that are orthogonal to each other (hereinafter, referred to as "I-data" and "Q-data", respectively) and demodulates the I-data and the Q-data. The digital demodulation data are stored in the waveform memory 141 according to the elapsing of the receive time.

The waveform memory 141 stores the waveform data of the test signal from the mobile communication terminal 2 output from the receive means 140. In addition, the waveform memory 141 has, for example, a configuration in which data writing and data reading are independently performed.

The waveform data stored in the waveform memory 141 are read and analyzed by the signal analysis unit 15. The signal analysis unit 15 includes a signal processing unit 150 that reads the waveform data from the waveform memory 141 and performs signal processing, a measurement means 151 that analyzes the waveform data and measures the transmission power or the EVM of the signal from the mobile communication terminal 2, and the analysis result memory 152 that stores the analysis result.

The demodulation data have, for example, the same frame data format as that of the modulation data of FIG. 7 and are obtained in a time position sequence of such a format. However, since the frames come one after another, the position of such a frame is ambiguous as it is.

In this regard, the synchronization processing unit 1502 of the signal processing unit 150 obtains synchronization with the demodulation data using either or both of the first and second synchronization signals P-SS or/and S-SS included in the demodulation data read from the waveform memory 141. That is, a frame position of the demodulation data, e.g., the leading end position thereof can be recognized.

The signal processing unit 150 specifies the leading end position of the frame based on the processing result of the synchronization processing unit 1502 and specifies the symbol number (hereinafter, referred to as a "time-oriented symbol number") of each symbol in the time direction included in a single slot. In addition, when the time-oriented symbol number is specified, the signal processing unit 150 specifies the symbol numbers (hereinafter, referred to as a "frequency-oriented symbol number") of each symbol in the frequency direction corresponding to each time-oriented symbol. It is possible to specify each symbol using the time-oriented symbol number and the frequency-oriented symbol number.

Since the frame position can be recognized, the FFT processing unit 1501 converts the time domain data to the frequency domain data by performing a fast Fourier transform (FFT) process for the demodulation data read from the waveform memory 141, for example, at least on a single subframe (2 slots, T=1 ms) basis from the leading end position of the frame, further converts each frequency component included in the frequency domain data into time domain data (frequency-oriented symbol) by performing an inverse discrete Fourier transform (IDFT) process, and transmits the result to the measurement means 151. In the case of the demodulation data of FIG. 7, the FFT processing is performed for data in each time-oriented symbol of FIG. 7(b) to output each frequency component at that time. Components including at least components of the frequency range (F to F+nΔF described above) of the current block are output (the band is nΔF, i.e., n times the band of RB, where n denotes an integer such as 1, 2, 3, ... ). In addition, the IDFT processing is performed for each data item in each frequency component output through the FFT processing to output data of each frequency-oriented symbol corresponding to each frequency component.

The measurement means 151 measures the EVM for each frequency-oriented symbol that can be simultaneously used. The measurement means 151 measures the EVM as described below. For each frequency-oriented symbol corresponding to each time-oriented symbol, a difference of the vectors between an ideal signal and an output (I-data and Q-data) of the FFT processing unit 1501 is calculated on the IQ plane.

For example, when a vector (vector on the IQ plane) of an ideal signal for the frequency-oriented symbol Fh corresponding to the subcarrier frequency and a time-oriented symbol of the Tk time is denoted by R(Tk, Fh), and a vector of the demodulation data at the time of the frequency-oriented symbol Fh corresponding to the subcarrier frequency and the symbol of the Tk time is denoted by M(Tk, Fh), the EVM of a single symbol can be expressed as follows.

$$\{M(Tk,Fh)-R(Tk,Fh)\}^2$$

The analysis result memory 152 is a storage area for storing the measurement value of the EVM of symbol unit measured using the measurement means 151 along with the symbol numbers (a time-oriented symbol number and a frequency-oriented symbol number) of each symbol. The analysis result memory 152 stores each symbol-based EVM measurement value, such that the measurement value of each symbol of the allocation band and the measurement value of each symbol corresponding to the non-allocation band can be distinguished, for example, by adding information identifying each measurement value, by receiving the transmission channel width and the allocation band as a measurement condition from the control unit 11 when each measurement value is stored and combining the transmission channel width and the allocation band with the symbol numbers of each symbol.

The display unit 17 is a display means for displaying a graph visualized based on the analysis result stored in the analysis result memory 152. The graph displayed on the display unit 17 is created by the display control unit 16 described below.

The display control unit 16 visualizes the symbol-based EVM measurement value stored in the analysis result memory 152 using a graph and displays the graph on the display unit 17. First, the display control unit 16 creates a coordinates system for displaying the symbol-based EVM measurement value and displays it on the display unit 17.

Figure 3:
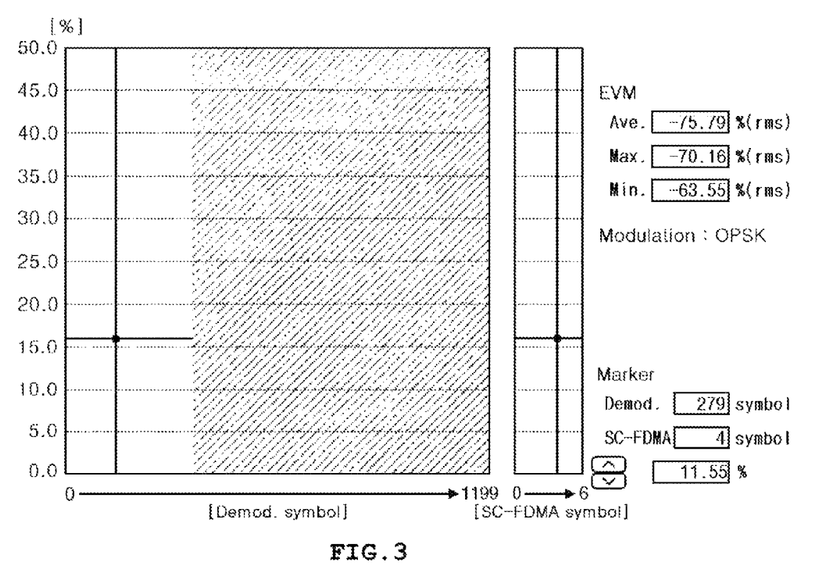
FIG. 3 illustrates a display example in which, as the EVM measurement result on a symbol-by-symbol basis, only the measurement value of the symbol corresponding to the allocation band is displayed, and an area for displaying the graph of the measurement value of the symbol corresponding to the allocation band and an area for displaying the graph of the measurement value of the symbol corresponding to the non-allocation band are separately displayed by color.

FIG. 3 illustrates a display example of the measurement result of the symbol-based EVM. As shown in FIG. 3, the display control unit 16 creates a coordinates system (hereinafter, referred to as a "first coordinates system") by setting the abscissa as the frequency-oriented symbol (hereinafter, referred to as "Demod Symbol") and the ordinate as the EVM. In the first coordinates system, it is difficult to display the result of all symbols. Therefore, the display control unit 16 creates another coordinates system (hereinafter, referred to as a "second coordinates system") by setting the abscissa as the time-oriented symbol (hereinafter, referred to as a "SC-FDMA symbol) and the ordinate as the EVM. By displaying both the first and second coordinates systems, it is possible to specify each symbol using the position on the abscissa (Demod Symbol) designated by the first coordinates system and the position of the ordinate (SC-FDMA symbol) designated by the second coordinates system.

In addition, the display control unit 16 sets the display range of the abscissa of the first coordinates system as a range of the frequency-oriented symbol (Demod Symbol) that can be simultaneously used. For example, in the example of FIG. 3 which shows a case in which the transmission channel width is set to 20 MHz, the number of RBs that can be simultaneously used is 100. Therefore, the number of frequency-oriented symbols is calculated such that (the number of frequency-oriented symbols in the vicinity of the RB)×(the number of RBs)=12×100=1200 so that the range of the abscissa on the first coordinates system becomes 0 to 1199. In addition, the display control unit 16 sets the display range of the abscissa on the second coordinates system to the range of the time-oriented symbols (SC-FDMA symbols) included in a single slot. Since the number of time-oriented symbols included in a single slot is 7, the range of the abscissa of the second coordinate system becomes 0 to 7.

In addition, the display control unit 16 determines display ranges of the ordinates of the first and second coordinates systems such that, for example, the lower limit is set to 0%, and the upper limit is set to the range where EVMs of each RB can be displayed. In this case, the upper limit may be determined based on the measurement values stored in the analysis result memory 152 or may be determined as a fixed value. in the following descriptions, it is assumed that the upper limit of the ordinate is set to a fixed value of 50%.

While the display ranges of each axis are automatically determined by the display control unit 16 in the aforementioned descriptions, a display manipulation unit (not shown) may be provided, and the display range may be changed by manipulation of a tester using the corresponding display manipulation unit.

If the coordinates system is created, the display control unit 16 displays the measurement values corresponding to each RB on the coordinates system as a graph. Specifically, when the symbol-based EVM measurement value is displayed, the display control unit 16 displays the symbol-based EVM measurement value for each frequency-oriented symbol (Demod Symbol) on the first coordinates system and displays the symbol-based EVM measurement value for each time-oriented symbol (SC-FDMA Symbol) on the second coordinates system.

In this case, the display control unit 16 links the measurement value displayed on the first coordinates system and the measurement value displayed on the second coordinates system. In this case, the display control unit 16 displays the EVM measurement value for each symbol on the first and second coordinates systems based on a predetermined symbol. In addition, the aforementioned predetermined symbol may be designated by a manipulator using the display manipulation unit (not shown), or may be a symbol having a specific symbol number set by the display control unit 16.

For example, the measurement result may be displayed by marking the symbol corresponding to a time-oriented symbol number of 2 and a frequency-oriented symbol number of 279. In this case, the measurement result of the frequency-oriented symbol corresponding to the symbol number 2 of the time-oriented symbol within a single slot is displayed on the first coordinates system by setting the position on the abscissa as the frequency-oriented symbol (Demod Symbol) and setting the position on the ordinate as the position of the EVM measurement value of each frequency-oriented symbol. In this case, the measurement result of the time-oriented symbol corresponding to the symbol number 279 of the frequency-oriented symbol is displayed on the second coordinates system by setting the position on the abscissa as the position of the time-oriented symbol and setting the position on the ordinate as the position of the EVM measurement value of each time-oriented symbol.

When the EVM measurement value is displayed on the coordinates system, the display control unit 16 changes a display method by distinguishing between the measurement value corresponding to the allocation band and the measurement value corresponding to the non-allocation band based on the identifier for identifying the allocation band and non-allocation band added to each measurement value.

Figure 4:
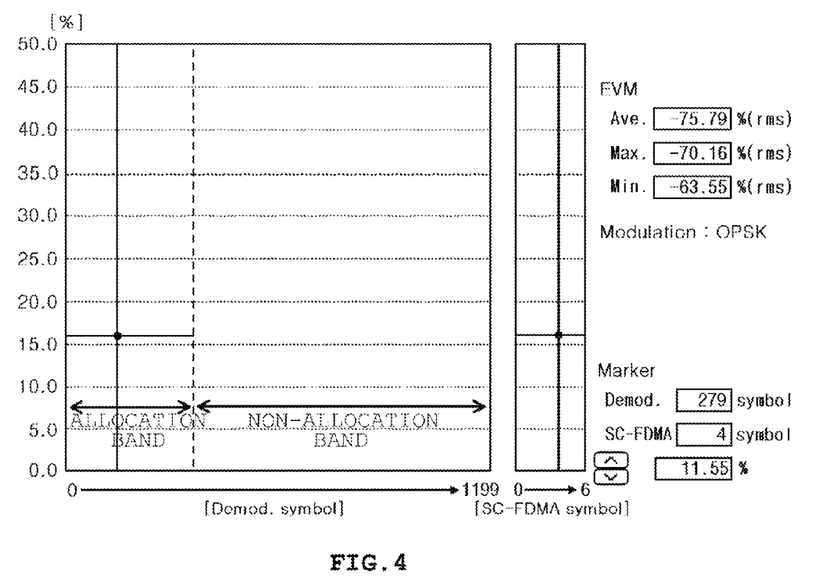
FIG. 4 is a display example in which, as the EVM measurement result on a symbol-by-symbol basis, only the measurement value of the symbol corresponding to the allocation band is displayed.

For example, the display control unit 16 may display only the measurement result of the symbol corresponding to the allocation band on each coordinates system. FIG. 4 shows a display example in the case where only the measurement value of the symbol corresponding to the allocation band is displayed as a result of the measurement of the symbol-based EVM.

When only the measurement result of the allocation band is displayed, the measurement means 151 may omit the process relating to the measurement of the symbol corresponding to the non-allocation band and store only the measurement result of the allocation band in the analysis result memory 152. In this case, the display control unit 16 reads only the measurement value of the symbol corresponding to the allocation band stored in the analysis result memory 152 and displays the measurement result.

Figure 5:
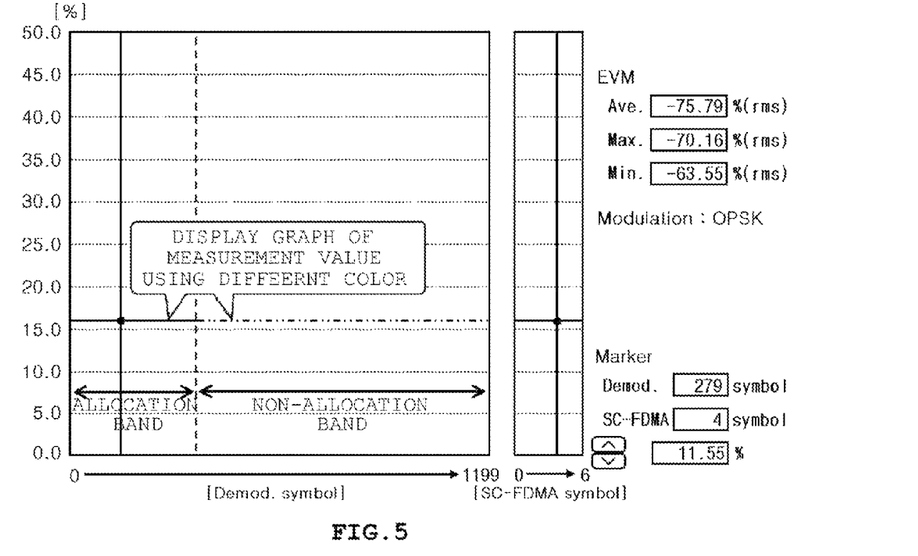
FIG. 5 is a display example in which, as the EVM measurement result on a symbol-by-symbol basis, a graph of the measurement value of the symbol corresponding to the allocation band and a graph of the measurement value of the symbol corresponding to the non-allocation band are separately displayed by color.

In addition, the display control unit 16 may display each of the graph of the measurement value of the symbol corresponding to the allocation band and the graph of the measurement value of the symbol corresponding to the non-allocation band by coloring at least any one of them to distinguish therebetween. FIG. 5 is a display example as a result of the symbol-based EVM measurement in the case where the graph of the measurement value of the symbol corresponding to the allocation band and the graph of the measurement value of the symbol corresponding to the non-allocation band are displayed in a distinguishable manner by color.

Figure 6:
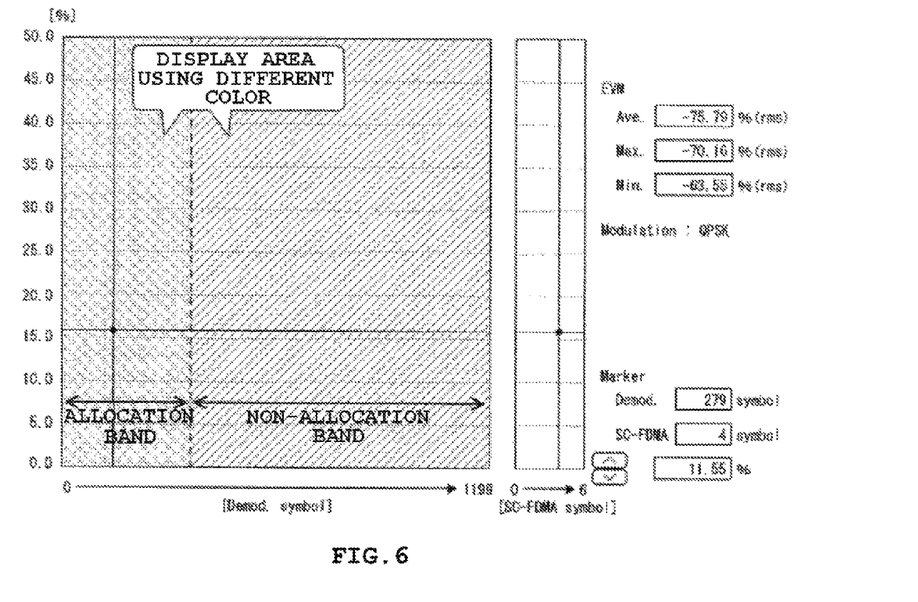
FIG. 6 is a display example in which, as the EVM measurement result on a symbol-by-symbol basis, an area for displaying a graph of the measurement value of the symbol corresponding to the allocation band and an area for displaying a graph of the measurement value of the symbol corresponding to the non-allocation band are separately displayed by color.

In addition, the display control unit 16 may distinguishably display each of the area for displaying the graph of the measurement value of the symbol corresponding to the allocation band and the area for displaying the graph of the measurement value of the symbol corresponding to the non-allocation band by coloring at least any one of them. FIG. 6 is a display example as a result of the symbol-based EVM measurement in the case where the area for displaying the graph of the measurement value of the symbol corresponding to the allocation band and the area for displaying the graph of the measurement value of the symbol corresponding to the non-allocation band are displayed in a distinguishable manner by color.

(Process)

Figure 2:
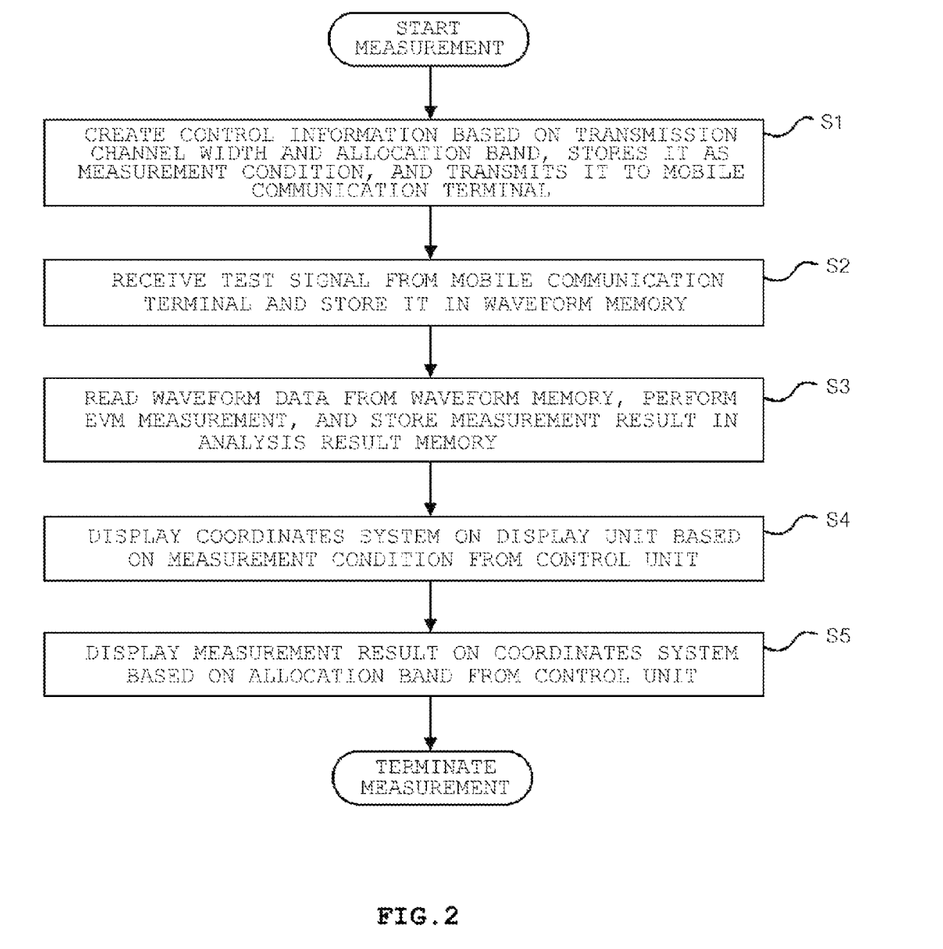
FIG. 2 is a flowchart illustrating a process of the mobile communication terminal test apparatus.

Next, a process of displaying the EVM measurement result of the signal from the mobile communication terminal 2 in the mobile communication terminal test apparatus 1 will be described in detail with reference to FIG. 2. FIG. 2 is a flowchart illustrating a process of the mobile communication terminal test apparatus 1.

(Step S1)

First, the control unit 11 receives from the manipulation unit 10 the band allocated to the mobile communication terminal 2 and the transmission channel width designated by a tester, specifies the allocation band (RB), creates the DCI based on the corresponding transmission channel width and the corresponding allocation band, and stores the created DCI as a measurement condition in the setup value storage unit 110. The measurement condition stored in the setup value storage unit 110 is transmitted at the timing when each of the signal transmit unit 12, the signal receive unit 14, and the signal analysis unit 15 is operated by the control unit 11. In addition, the control unit 11 transmits the DCI to the signal transmit unit 12 and instructs the mobile communication terminal 2 to transmit signals including the corresponding DCI. The signal transmit unit 12 transmits the transmission signal in response to the instruction from the control unit 11, and the mobile communication terminal 2 transmits the test signal to the signal receive unit 14 using the allocation band and the transmission channel width designated by the DCI based on the DCI included in the transmission signal from the signal transmit unit 12.

(Step S2)

Next, the signal receive unit 14 receives the test signal from the mobile communication terminal 2, converts the test signal into an intermediate frequency signal and further into the digital data, and stores the result as the waveform data in the waveform memory 141 after orthogonal demodulation. Steps S1 and S2 correspond to the transmission step and the waveform data output step, respectively.

(Step S3)

The waveform data stored in the waveform memory 141 are read by the signal processing unit 150. The signal processing unit 150 specifies each RB and the frame position of the signal to be measured, and the symbol numbers of each symbol (the time-oriented symbol number and the frequency-oriented symbol number) by performing signal processing for the read waveform data. The measurement means 151 receives the result of the signal processing in the signal processing unit 150, measures the EVM of each symbol included in the RB, and stores each measurement result in the analysis result memory 152. This step S3 corresponds to the measurement step.

When each measurement result from the measurement means 151 is stored, the analysis result memory 152 receives the allocation band and the transmission channel width as a measurement condition from the control unit 11 and distinguishably stores the symbol-based EVM measurement values by adding information for identifying each of the measurement value of the symbol of the allocation band and the measurement value of the symbol of the non-allocation band or the like.

(Step S4)

Next, the display control unit 16 creates a coordinates system and displays it on the display unit 17. Specifically, the display control unit 16 displays a first coordinates system as the corresponding coordinates system by setting the abscissa as the frequency-oriented symbol (Demod Symbol) and the ordinate as the EVM and a second coordinates system by setting the abscissa as the time-oriented symbol (SC-FDMA symbol) and the ordinate as the EVM. Step S4 corresponds to the coordinates display step.

(Step S5)

Next, the display control unit 16 displays the symbol-based EVM measurement value stored in the analysis result memory 152 as a graph on the corresponding coordinates system. This step S5 corresponds to the measurement display step.

Specifically, the display control unit 16 displays the symbol-based EVM measurement value on the first and second coordinates systems. In this case, the display control unit 16 displays, on the first coordinates system, the measurement result of the frequency-oriented symbol corresponding to a predetermined time-oriented symbol (e.g., a symbol corresponding to a symbol number of 2) within a single slot by setting the abscissa as the position of the frequency-oriented symbol (Demod Symbol) and the ordinate as the position of the EVM measurement value of each frequency-oriented symbol. In addition, the display control unit 16 displays, on the second coordinates system, the measurement result of the time-oriented symbol corresponding to a predetermined frequency-oriented symbol (e.g., a symbol corresponding to a symbol number of 279) by setting the position of the abscissa as the time-oriented symbol (SC-FDMA symbol) and the position of the ordinate as the position of the EVM measurement value of each time-oriented symbol.

In this case, the display control unit 16 changes the display method by distinguishing between the measurement value corresponding to the allocation band and the measurement value corresponding to the non-allocation band based on the identifiers for identifying the non-allocation band and the allocation band added to each measurement value.

Specifically, as shown in FIG. 4, the display control unit 16 may display only the measurement result of the symbol corresponding to the allocation band on each coordinates system. In addition, as shown in FIG. 5, the display control unit 16 may distinguishably display each of the graph of the measurement value of the symbol corresponding to the allocation band and the graph of the measurement value of the symbol corresponding to the non-allocation band by coloring at least any one of them. In addition, as shown in FIG. 6, the display control unit 16 may distinguishably display each of the area for displaying the graph of the measurement value of the symbol corresponding to the allocation band and the area for displaying the graph of the measurement value of the symbol corresponding to the non-allocation band by coloring at least any one of them.

In addition, while the display control unit 16 separately displays the coordinates system and the measurement value in steps S4 and S5, the coordinates system and the measurement value may be simultaneously displayed on the display unit 17 after the display data of the coordinates system is prepared in step S4, and the display data of the measurement value is prepared in step S5.

While the EVM measurement for each symbol is displayed, for example, by distinguishing between the measurement result of the allocation band and the measurement result of the non-allocation band in the aforementioned description, the measurement result of the measurement of the transmission power for each RB may be similarly displayed. In this case, the display control unit 16 may receive information on the allocation band (RB) and the transmission channel width as a measurement condition from the control unit 11 and display the measurement value of the transmission power for each RB by distinguishing between the measurement value of the allocation band and the measurement value of the non-allocation band.

Through the aforementioned process, a tester can readily identify the portion corresponding to the measurement value of the allocation band from the displayed graph and readily determine whether the measurement is right or wrong.

DESCRIPTION OF REFERENCE NUMERALS AND SIGNS

- 1: mobile communication terminal test apparatus
- 2: mobile communication terminal
- 10: manipulation unit
- 11: control unit
- 12: signal transmit unit
- 13: directional coupler
- 14: signal receive unit
- 15: signal analysis unit
- 16: display control unit
- 17: display unit
- 110: setup value storage unit
- 120: transmission control means
- 121: transmit means
- 140: receive means:
- 141: waveform memory
- 150: signal processing unit
- 1501: FFT processing unit
- 1502: synchronization processing unit
- 151: measurement means
- 152: analysis result memory

The invention claimed is:

1. A mobile communication terminal test apparatus comprising:
   a signal transmit unit that transmits a signal including control information for controlling a mobile communication terminal to the mobile communication terminal;
   a signal receive unit that receives a test signal output from the mobile communication terminal based on the control information and outputs waveform data;
   a signal analysis unit that measures a measurement value relating to a predetermined measurement item on a symbol-by-symbol basis based on the waveform data; and
   a display unit that displays the measurement value measured by the signal analysis unit,
   wherein the mobile communication terminal transmits or receives the signal according to a frequency division multiple access communication scheme, and the control information includes information on a communication channel and an allocation band allocated to the mobile communication terminal within the communication channel, and
   wherein the mobile communication terminal test apparatus further includes:
   a control unit that notifies the signal transmit unit, the signal receive unit, and the signal analysis unit of a test condition including the communication channel, a bandwidth of the communication channel, and a bandwidth of the allocation band; and
   a display control unit that receives the measurement value and the test condition from the signal analysis unit, displays, on the display unit, coordinates by setting the abscissa as a frequency-oriented symbol corresponding to the bandwidth of the communication channel and the ordinate as a measurement value, displays the measurement value on the coordinates as a graph, and displays the allocation band on the corresponding graph and bands other than the allocation band within the communication channel in a distinguishable manner.

2. The mobile communication terminal test apparatus according to claim 1, wherein the predetermined measurement item includes either an error vector magnitude (EVM) representing a positional difference between a measurement modulation signal and an ideal modulation signal within a band of the communication channel or a transmission power of the mobile communication terminal.

3. A test result display method comprising:
   a transmission step in which a signal including control information is transmitted to a mobile communication terminal;
   a waveform data output step in which a test signal output from the mobile communication terminal based on the control information is received and output as waveform data;
   a measurement step in which a measurement value relating to a predetermined measurement item is measured on a symbol-by-symbol basis based on the waveform data;
   a coordinates display step in which coordinates are displayed by setting an abscissa as a frequency-oriented symbol and an ordinate as the measurement value; and
   a measurement value display step in which a first graph representing the measurement value is displayed on the coordinates,
   wherein, in the transmission step, the control information based on the measurement condition including a communication channel, a bandwidth of the communication channel, and an allocation band allocated to the mobile communication terminal within the communication channel is transmitted according to a frequency division multiple access communication scheme,
   in the measurement step, the measurement value within at least a range of the allocation band is measured,
   in the coordinates display step, the coordinates are displayed by setting the abscissa as a frequency-oriented symbol corresponding to the bandwidth of the communication channel, and
   in the measurement value display step, the first graph is displayed by setting the abscissa as the allocation band and the ordinate as the measurement value based on the communication channel, the bandwidth of the communication channel, and the allocation band.

4. The test result display method according to claim 3, wherein, in the measurement step, the measurement value of the signal for the non-allocation band other than the allocation band within the communication channel is further measured on a symbol-by-symbol basis, and
   in the measurement value display step, a second graph is further displayed on the coordinates so as to be distinguished from the first graph by setting the abscissas as a symbol within the non-allocation band and the ordinate as a measurement value of a signal within the non-allocation band.

5. The test result display method according to claim 4, wherein, in the measurement value display step, at least any one of the first and second graphs is colored.

6. The test result display method according to claim 4, wherein, in the measurement value display step, at least any one of an area for displaying the first graph and an area for displaying the second graph is colored.

7. The test result display method according to claim 3, wherein the predetermined measurement item includes either an error vector magnitude (EVM) representing a positional difference between a measurement modulation signal and an ideal modulation signal within a band of the communication channel or a transmission power of the mobile communication terminal.

* * * * *